US008615358B2

(12) United States Patent
Fraser et al.

(10) Patent No.: US 8,615,358 B2
(45) Date of Patent: Dec. 24, 2013

(54) SYSTEM AND METHOD FOR ZONE BASED INITIAL ROUTE GUIDANCE WITHIN A TELEMATICS EQUIPPED MOBILE VEHICLE (75) Inventors: Ronald W. Fraser, Lake Orion, MI (US); James J. Piwowarski, Holly, MI (US); Mark J. Glaza, Warren, MI (US); John P. Weiss, Shelby Township, MI (US)

(73) Assignee: General Motors LLC, Detroit, MI (US)

( * ) Notice: Subject to any disclaimer, the term of this patent is extended or adjusted under 35 U.S.C. 154(b) by 2626 days.

(21) Appl. No.: 11/138,985

(22) Filed: May 26, 2005

(65) Prior Publication Data

US 2006/0271283 A1 Nov. 30, 2006

(51) Int. Cl.
*G01C 21/00* (2006.01)

(52) U.S. Cl.
USPC ........... 701/400; 701/408; 701/410; 701/411; 701/416; 701/421; 701/426; 701/437; 701/438

(58) Field of Classification Search
USPC ............................................................ 701/1
See application file for complete search history.

(56) References Cited

U.S. PATENT DOCUMENTS

| 4,812,843 | A | 3/1989 | Champion, III et al. | |
| 6,252,544 | B1 | 6/2001 | Hoffberg | |
| 6,542,818 | B1 | 4/2003 | Oesterling | |
| 6,823,257 | B2 * | 11/2004 | Clapper | 701/207 |
| 6,856,901 | B2 * | 2/2005 | Han | 701/211 |
| 6,925,378 | B2 | 8/2005 | Tzamaloukas | |
| 2003/0236818 | A1 | 12/2003 | Bruner et al. | |
| 2004/0142678 | A1 | 7/2004 | Krasner | |
| 2005/0215200 | A1 | 9/2005 | Oesterling | |

OTHER PUBLICATIONS

U.S. Appl. No. 10/983,772, filed Nov. 8, 2004, John P. Weiss, et al.
U.S. Appl. No. 11/145,662, filed Jun. 6, 2005, John P. Weiss, et al.
U.S. Appl. No. 11/063,481, filed Feb. 23, 2005, Mark J. Glaza.
U.S. Appl. No. 11/014,498, filed Dec. 16, 2004, Fraser, et al.
U.S. Appl. No. 11/136,161, filed May 23, 2005, Mark J. Glaza.
U.S. Appl. No. 10/909,500, filed Aug. 2, 2004, Hitan S. Kamdar, et al.

* cited by examiner

*Primary Examiner* — Bhavesh V Amin
(74) *Attorney, Agent, or Firm* — Leydig, Voit & Mayer, Ltd.

(57) ABSTRACT

The present invention provides a method of operating a telematics enabled mobile vehicle communication system. The method includes receiving a navigation request from a user interface to a telematics unit, receiving a location signal defining an approximate geographic location of the telematics unit to the telematics unit, analyzing the navigation request and the location signal to produce a navigation route defined by a plurality of navigation points including an initial navigation point and one or more additional navigation points, producing a local navigation zone and a global navigation zone based on the analyzed location signal wherein each navigation zone defines a geographic area concentrically radiating from a known geographic location, determining which navigation zone the initial navigation point is within, and producing navigation instructions that provide direction to navigation points along the navigation route and are based on the determined navigation zone and the navigation route.

17 Claims, 6 Drawing Sheets

SYSTEM AND METHOD FOR ZONE BASED INITIAL ROUTE GUIDANCE WITHIN A TELEMATICS EQUIPPED MOBILE VEHICLE

FIELD OF THE INVENTION

This invention relates generally to wireless communications. More specifically, the invention relates to a method and system for operating a telematics enabled mobile vehicle communication system.

BACKGROUND OF THE INVENTION

The opportunity to utilize wireless features is ever increasing as cellular transceivers are being transformed into entertainment as well as communication platforms. One such cellular transceiver is a wireless feature included within wireless vehicle communication and networking services for a mobile vehicle. Another such cellular transceiver includes capabilities to receive satellite broadcasts such as, for example, Global Positioning System (GPS) signals and satellite radio signals.

Typically, wireless systems within mobile vehicles (e.g., telematics units) provide voice communication. These wireless systems have also been utilized to update systems within telematics units such as, for example, radio station presets. Additionally, these wireless systems have been utilized to send data to service providers. For example, sensor data may be sent to assist the mobile vehicle manufacturer in maintaining the mobile vehicle. Another use for such wireless systems includes navigation assistance that incorporates aspects of an on-board GPS system.

Unfortunately, most conventional navigation assistance systems employ cardinal directional information, such as, for example the terms "North" or "South" when providing a user with directional information. Such cardinal directional information is typically not of great usefulness when conventional navigation assistance systems are typically employed. That is, most users of navigation assistance systems tend to utilize the system when in unfamiliar territory or when navigating to or through unfamiliar territory. Cardinal direction instructions tend to be much less useful in such situations.

The present invention advances the state of the art for operating a telematics enabled mobile vehicle communication system.

SUMMARY OF THE INVENTION

One aspect of the invention includes a method of operating a telematics enabled mobile vehicle communication system. The method includes receiving a navigation request from a user interface and a location signal defining an approximate geographic location of the telematics unit to a telematics unit. The method further includes analyzing the navigation request and the location signal to produce a navigation route that is defined by a plurality of navigation points including an initial navigation point and one or more additional navigation points. The method additionally includes producing a local navigation zone and a global navigation zone based on the analyzed location signal wherein each navigation zone defines a geographic area concentrically radiating from a known geographic location. The method further includes determining which navigation zone the initial navigation point is within. The method additionally includes producing navigation instructions based on the determined navigation zone and the navigation route wherein the navigation instructions provide direction to navigation points along the navigation route.

In accordance with another aspect of the invention, a computer readable medium storing a computer program for operating a telematics enabled mobile vehicle communication system includes computer readable code for providing a received navigation request from a user interface to a telematics unit, computer readable code for providing a received location signal to the telematics unit, the location signal defining an approximate geographic location of the telematics unit. The medium further includes computer readable code for analyzing the navigation request and the location signal to produce a navigation route, the navigation route defined by a plurality of navigation points including an initial navigation point and one or more additional navigation points and computer readable code for producing a local navigation zone and a global navigation zone based on the analyzed location signal, each navigation zone defining a geographic area concentrically radiating from a known geographic location. In addition, the medium computer readable code for determining which navigation zone the initial navigation point is within; and computer readable code for producing navigation instructions based on the determined navigation zone and the navigation route, wherein the navigation instructions provide direction to navigation points along the navigation route.

In accordance with yet another aspect of the invention, a telematics enabled mobile vehicle communication system is provided. The system includes means for receiving a navigation request from a user interface to a telematics unit and means for receiving a location signal defining an approximate geographic location of the telematics unit to the telematics unit. The system additionally includes means for analyzing the navigation request and the location signal to produce a navigation route that is defined by a plurality of navigation points including an initial navigation point and one or more additional navigation points. Means for producing a local navigation zone and a global navigation zone based on the analyzed location signal wherein each navigation zone defines a geographic area concentrically radiating from a known geographic location are provided. Means for determining which navigation zone the initial navigation point is within are provided. Means for producing navigation instructions based on the determined navigation zone and the navigation route wherein the navigation instructions provide direction to navigation points along the navigation route are also provided.

The aforementioned and other features and advantages of the invention will become further apparent from the following detailed description of the presently preferred embodiments, read in conjunction with the accompanying drawings. The drawings are not drawn to scale. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
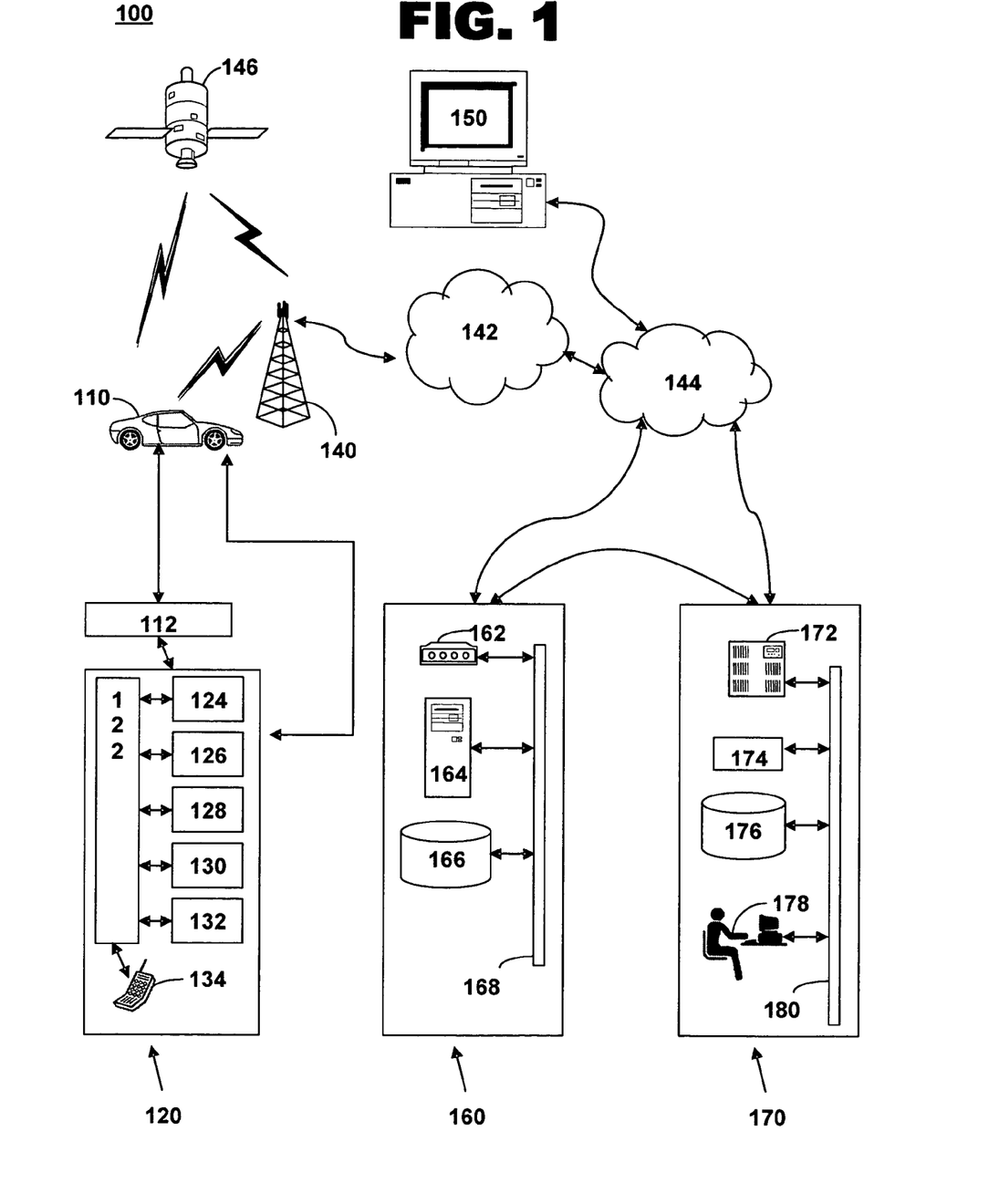
FIG. 1 illustrates an operating environment for implementing wireless communication within a mobile vehicle communication system.

FIG. 1 illustrates one embodiment of an operating environment for implementing wireless communication within a mobile vehicle communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

Vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In various embodiments, processor 122 is implemented as a microcontroller, controller, digital signal processor (DSP), host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). GPS unit 126 additionally provides time information based on the received GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In yet another embodiment, broadcast services include various generically formatted data packets regularly transmitted by satellite broadcast system 146. In an example, generically formatted data packets such as, for example, pseudo-random code received by telematics unit 120, are processed by processor 122. In this example, pseudo-random code received by telematics unit 120 is processed into GPS coordinates by processor 122, such as by trilateration, and provided to telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more land-line telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In one embodiment, a client utilizes computer 150 to provide radio station presets as user preferences for MVCU 110. In an example, user-preference data from client-side software is transmitted to server-side software of web-hosting portal 160. In this example, user-preference data is stored at web-hosting portal 160. In another example, user-preference data from client-side software is transmitted to server-side software of web-hosting portal 160. In this example, user-preference data is stored at web-hosting portal 160 and later transmitted to MVCU 110 via wireless carrier system 140 or satellite broadcast system 146. In another example, user-preference data is transmitted directly to MVCU 110 via wireless carrier system 140 or satellite broadcast system 146.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. In one embodiment, communication services manager 174 includes at least one analog and/or digital modem.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example roadside assistance, vehicle updates, and the like to telematics unit 120 in MVCU 110 through wireless carrier system 140, communication network 142, land network 144, satellite broadcast system 146, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through satellite broadcast system 146, communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
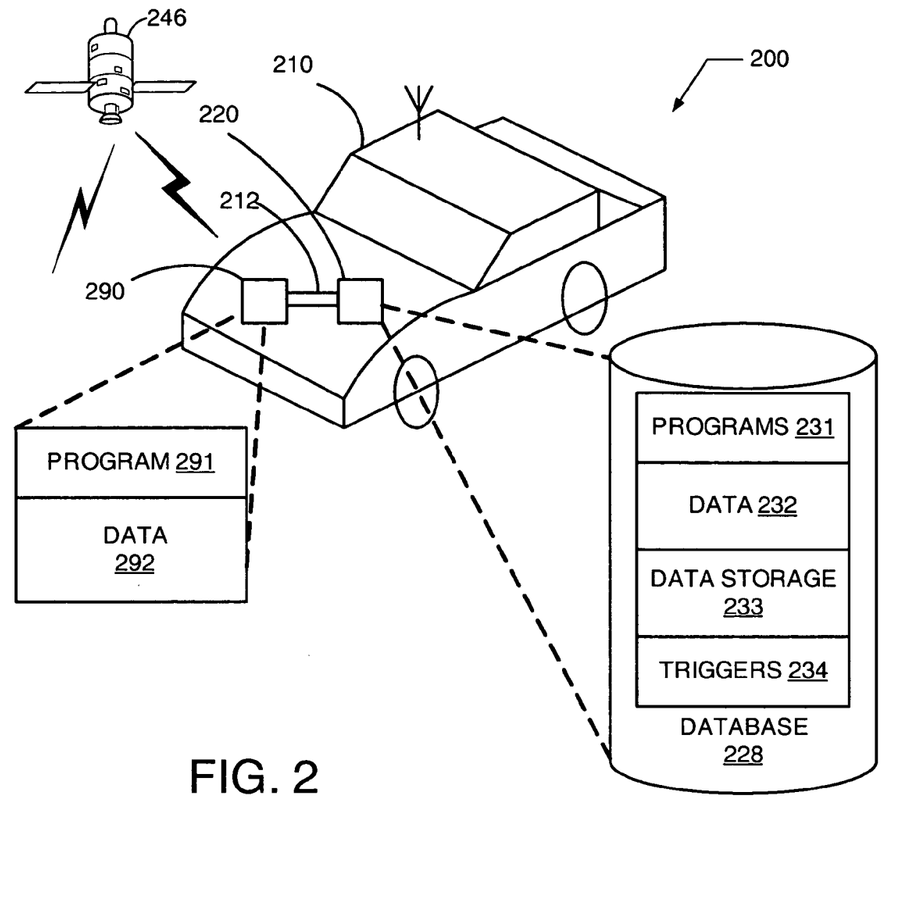
FIG. 2 is a block diagram of a telematics-based system in accordance with an embodiment of the present invention.

FIG. 2 is a block diagram of a telematics-based system in accordance with an embodiment of the present invention. FIG. 2 shows a telematics-based system 200 for operating a vehicle telematics device as a data collection and transmission device.

In FIG. 2, the telematics-based system 200 includes a mobile vehicle 210, and satellite broadcast system 246. Mobile vehicle 210 includes a telematics unit 220 coupled to one or more vehicle system modules 290 via a vehicle communication network 212. Telematics unit 220 further includes a database 228 that contains programs 231, program data 232, data storage 233, and triggers 234. In one embodiment, a trigger is an activator that initiates one or more events responsive to one or more input conditions. For example, an input condition is a button push or a vehicle bus message responsive to a event. In one embodiment, a trigger is defined by a name and at least one input condition, and is configured to be referenced by a software package and/or activate at least one event based on the input conditions. One or more vehicle system modules (VSM) 290 are included within mobile vehicle 210 and each VSM 290 further includes program 291 and data 292. In another embodiment, a VSM 290 within mobile vehicle 210 is located within telematics unit 220. In FIG. 2, the elements are presented for illustrative purposes and are not intended to be limiting. Telematics-based system 200 may include additional components not relevant to the present discussion.

Telematics unit 220 is any telematics device enabled for operation with a telematics service provider such as, for example, telematics unit 120 as described with reference to FIG. 1. Telematics unit 220 in vehicle 210 is in communication with a service provider (e.g., a "service center"). Telematics unit 220 includes volatile and non-volatile memory components for storing data and programs. In one embodiment, memory components in telematics unit 220 contains database 228. Telematics unit 220 additionally includes one or more user interfaces (not shown), such as those described for FIG. 1, above. Examples of user interfaces (UI) include an audio user interface, a text user interface, a video user interface, a combination video/text user interface, a combination audio/text user interface, and the like. In other embodiments, a UI is implemented as a voice user interface, a voice menu, a physical user interface, a button user interface, a liquid crystal display, and a text-to-speech interface.

Database 228 includes one or more programs 231 for operating telematics unit 220. For example, database 228 includes a program for operating a vehicle telematics device to receive data collected from antennae, for operating a vehicle telematics device as a satellite signal receiver, and the like. In operation, program 231 executes loaded programs containing instructions and/or received instructions and data in the form of on-board programming, a data stream from a service provider, commands from a user interface (not shown), and the like. In one embodiment, data storage 233 contains vehicle identification information, such as, for example, vehicle account information and the like. Program 231 executes the instructions, for example, by parsing the data stream/program instructions for additional instructions, data and triggers. In one embodiment, program 231 parses the data stream/program instructions and stores input conditions with an associated name to operate as a trigger at triggers 234. In this embodiment, program 231 transfers data to and receives data from VSM 290 for execution. In an example, program 231 parses the data stream/program instructions and determines current location information, such as location information from a satellite broadcast system. In one embodiment, the location information may be GPS information. In another example, program 231 receives vehicle diagnostic information from VSM 290 and transmits the vehicle diagnostic information to a service provider. In yet another example, program 231 receives vehicle diagnostic information from VSM 290 as well as GPS information and produces diagnostic information that is transmitted to a service provider.

VSM 290 is any vehicle system control module having software and hardware components for operating, controlling, or monitoring one or more vehicle systems and sensors. In one embodiment, VSM 290 provides location information and is a global positioning system (GPS) module such as, for example, GPS unit 126 of FIG. 1. In another embodiment, VSM 290 is a control module for receiving sensor information and processing the received sensor information.

Vehicle system module 290 contains one or more processors, one or more memory devices, and one or more connection ports. In one embodiment, VSM 290 includes a software switch for scanning received satellite broadcast information, such as received GPS information. VSM 290 is coupled to vehicle communication network 212 and, therefore, is coupled directly or indirectly to any other device that is also coupled to vehicle communication network 212. In an example, vehicle communication network 212 is a vehicle communication network 112 as described in FIG. 1, above. In one embodiment, VSM 290 is directly coupled to telematics unit 220 in primary mobile vehicle 210. In this embodiment, vehicle communication network 212 directly couples telematics unit 220 to vehicle system module 290. In another embodiment, VSM 290 is indirectly coupled to telematics unit 220.

In operation, when VSM 290 is implemented as a GPS receiver unit, program 291 operating within VSM 290 generates location information based on received GPS information, and stores the generated location information at data 292. VSM 290 provides the location information, such as in the form of a location signal, to telematics unit 220 when required.

Satellite broadcast system 246 is any satellite broadcast system enabled for operation as a global positioning system (GPS) provider, such as, for example satellite broadcast system 146 as described with reference to FIG. 1. In one embodiment, satellite broadcast system 246 provides time based GPS information to a vehicle system module implemented as a GPS receiver.

In illustrative operation and described below in FIGS. 3 and 4, program 231 of telematics unit 220 operates as a navigation system and receives location information from VSM 290 defining an approximate geographic location of telematics unit 220. Program 231 additionally receives a navigation request from a user interface (not shown). Program 231 stores the navigation request and the location signal at data storage 233. Program 231 analyzes the navigation request and the location signal to produce a navigation route that includes a plurality of navigation points defining the navigation route. Program 231 produces a local navigation zone and a global navigation zone (described in FIG. 3, below) based on the analyzed location signal and determines the navigation zone the first navigation point is located within. Program 231 produces navigation instructions based on the determined navigation zone and the navigation route. In one embodiment, the produced navigation instructions are provided to a user interface.

Figure 3:
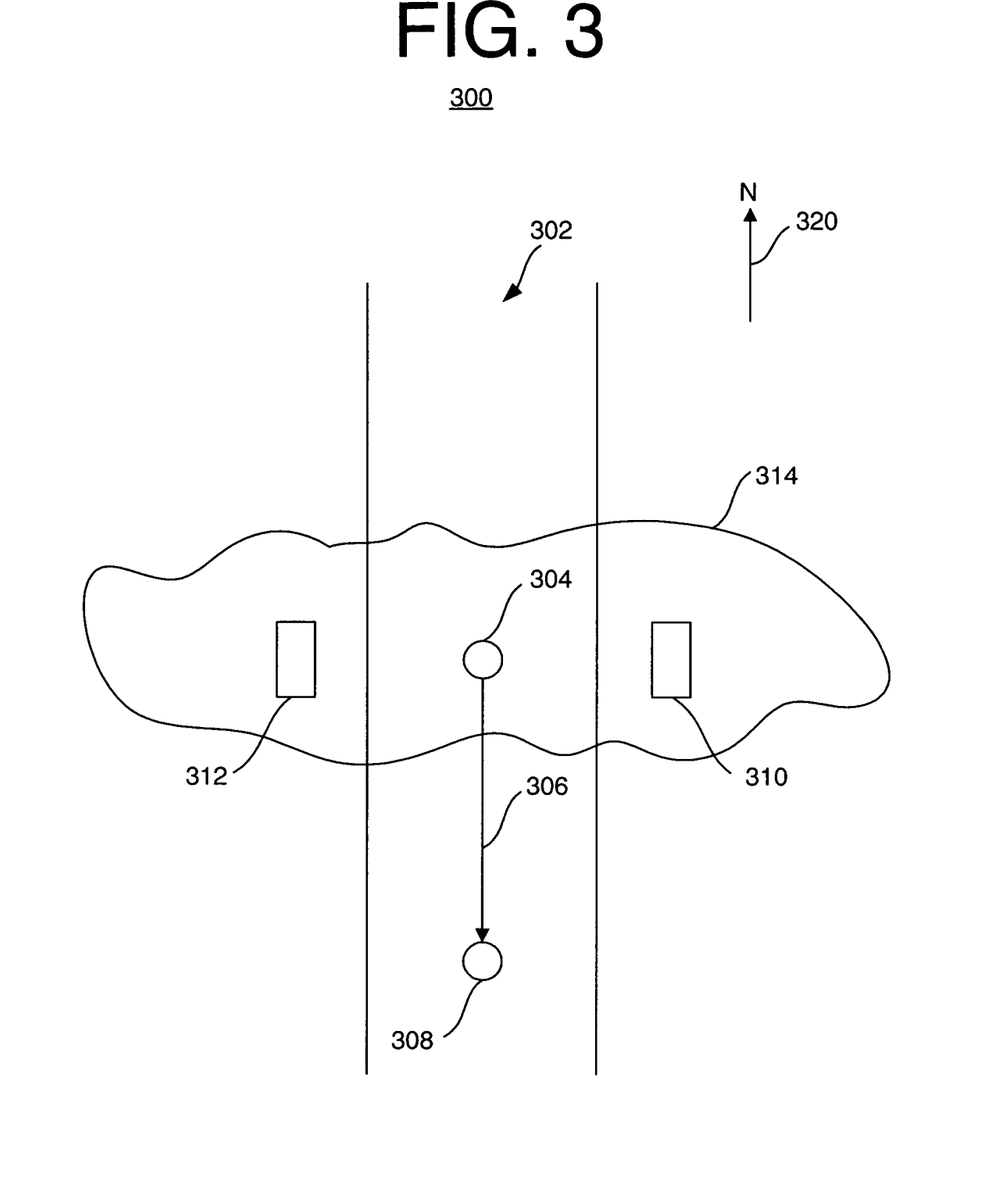
FIG. 3 is a schematic diagram illustrating a directional map in accordance with an embodiment of the present invention.

FIG. 3 graphically illustrates one embodiment of a method for providing navigation instructions to a vehicle that is within a region of GPS uncertainty or interference. Illustration 300 features a road segment 302 upon which a maneuver is to occur—i.e. the driver of a vehicle is to turn right or left to travel in a northerly or southerly direction (indicated by compass direction 320). A zone of uncertainty 314 contains two potential vehicle positions 310, 312 surrounding an initial maneuver position 304. A destination position 308 represents either a destination or the location of a next navigational maneuver. The direction of desired travel is indicated by direction 306. In FIG. 3, the desired travel direction is indicated as to the south.

A zone of uncertainty 314 may result from positional error of a GPS unit, or other GPS interference.

Since vehicle positions 310, 312 both lie within a zone of uncertainty 314, the provider of navigational instructions is unable to determine whether the recipient of the instructions is to turn "right" or turn "left," and must rely on providing a direction to travel "south". If the initial maneuver position lies within the zone of uncertainty, cardinal instructions are provided the driver. The term "directional instructions" is defined to provide an instruction to navigate to the recipient's "right" or "left." The term "cardinal instructions" is defined as an instruction to travel in a particular compass direction, such as north, south, east or west.

Figure 4:
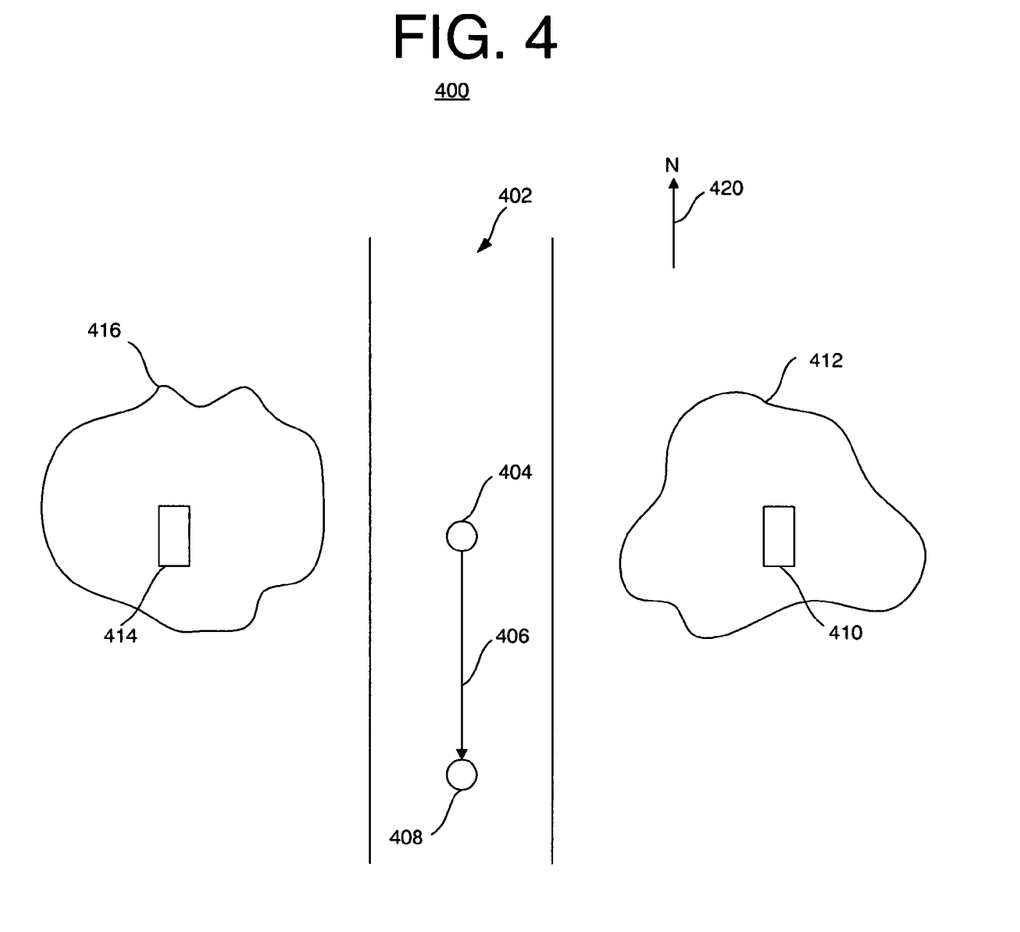
FIG. 4 is a schematic diagram illustrating a directional map in accordance with another embodiment of the present invention.

FIG. 4 graphically illustrates another embodiment of a method 400 for providing navigational instructions to a driver. At 400, vehicle positions 410 and 414 remain within a zone of GPS uncertainty or interference. Direction 406 is the direction to be traveled from initial point 404 to destination point 408 along road segment 402. Zones 412 and 416 are the zones of uncertainty, and contain vehicle positions 414 and 410. The provider of navigational instructions remains unable to pinpoint the precise location of a vehicle within zones 412 and 416, but is able to determine that the entirety of each zone lies on one geographic side (i.e. zone 416 is west of road segment 402 and zone 412 is east of road segment 402). Because neither zone 412, 416 intersects road segment 402, a navigation direction may be provided to indicate that a vehicle within zone 416 is to "turn right" on road segment 402, and a vehicle within zone 412 is to "turn left" on road segment. In the event that neither zone of uncertainty includes the initial maneuver position, a directional instruction is provided the driver.

Figure 5:
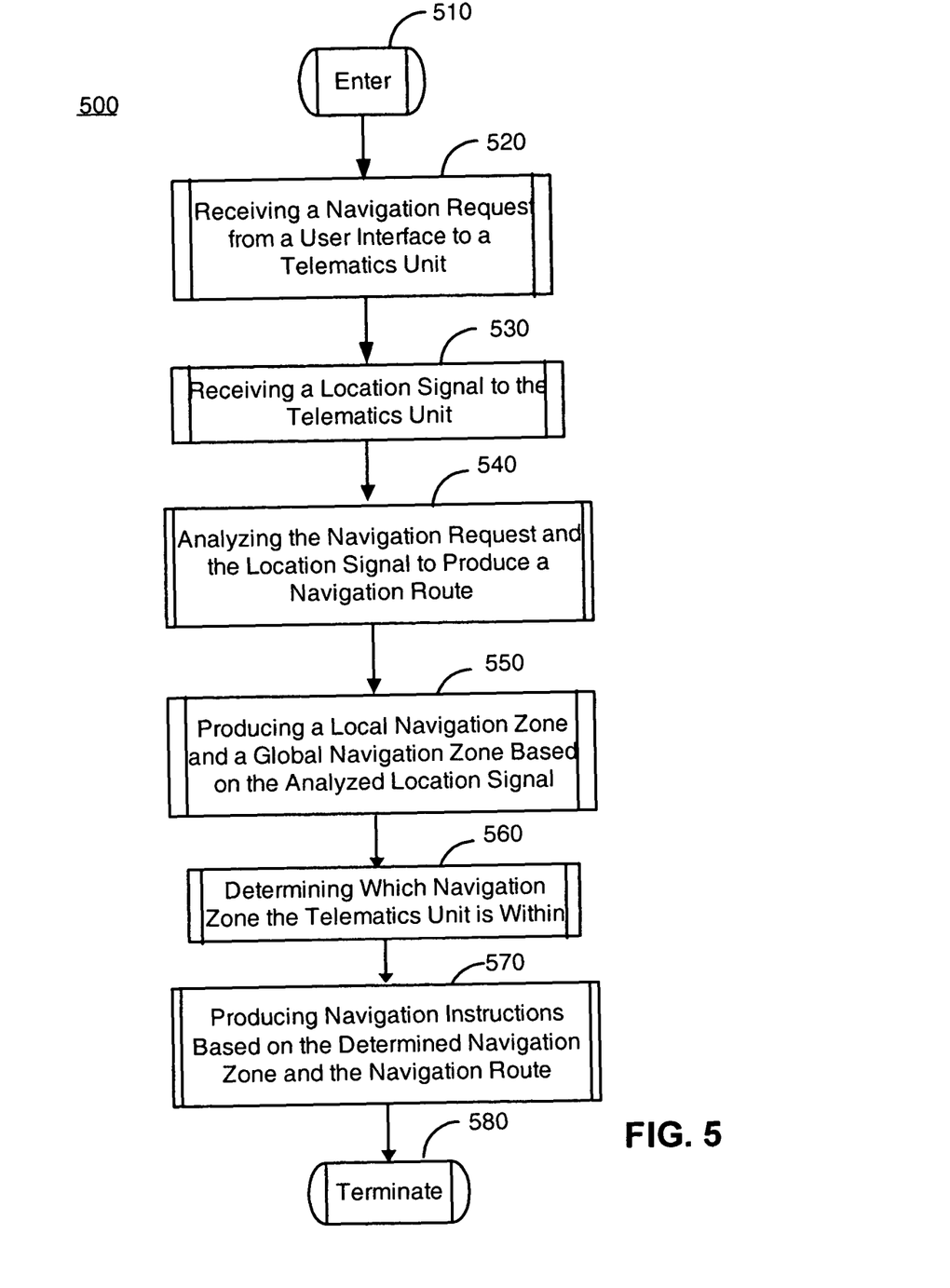
FIG. 5 is a flow diagram of one embodiment of a method of operating a vehicle telematics device, in accordance with the present invention.

FIG. 5 is a flow diagram of one embodiment of a method of operating a telematics enabled mobile vehicle communication system. In FIG. 5, method 500 may utilize one or more systems and concepts detailed in FIGS. 1-4, above. The present invention can also take the form of a computer usable medium including a computer program for operating a telematics enabled mobile vehicle communication system. The program stored in the computer usable medium includes computer program code for executing the method steps described in FIG. 5. In FIG. 5, method 500 begins at step 510.

At step 520, a navigation request is received from a user interface by a telematics unit. In one embodiment, the navigation request identifies a user desired destination location. Examples of user interfaces (UI) include an audio user interface, a text user interface, a video user interface, a combination video/text user interface, a combination audio/text user interface, and the like. In other embodiments, a UI is implemented as a voice user interface, a voice menu, a physical user interface, a button user interface, a liquid crystal display, and a text-to-speech interface.

At step 530, a location signal is received by the telematics unit. The location signal defines an approximate geographic location of the telematics unit. In one embodiment, the location signal is received to the telematics unit from a vehicle system module implemented as GPS receiver. In an example and referring to FIG. 2, the location signal is received to telematics unit 220 from vehicle system module 290 that it implemented as GPS receiver.

At step 540, the navigation request and the location signal are analyzed to produce a navigation route. The navigation route is defined by navigation points. In an example and referring to FIG. 3, navigation route 320 is defined by initial navigation point 321 and navigation point 322. In another example and referring to FIG. 4, navigation route 420 is defined by initial navigation point 421 and navigation point 422.

At step 550, a local navigation zone and a global navigation zone are produced based on the analyzed location signal. In one embodiment and illustrated in FIG. 3, each zone defines a geographic area concentrically radiating from a known geographic location. In another embodiment, the local navigation zone is associated with the approximate geographic location of the known geographic location. In an example and referring to FIG. 3 above, local navigation zone 310 is associated with the approximate geographic location of the known geographic location, such as, the intersection of street 301 and street 302. In yet another embodiment, the local navigation zone is associated with the approximate geographic location of the telematics unit. In an example and referring to FIG. 4, local navigation zone 410 is associated with the approximate geographic location of mobile vehicle 430 within initial navigation point 405.

At step 560, the navigation zone that the initial navigation point is within is determined. The initial navigation point is determined to be either within the local navigation zone or the global navigation zone. In an example and referring to FIG. 3, initial navigation point 321 is determined to be in local navigation zone (Zone A) that is within the area defined by area 310. In an example and referring to FIG. 4, initial navigation point 421 is determined to be in global navigation zone (Zone B) that is outside the area defined by area 410.

At step 570, navigation instructions are produced based on the determined navigation zone and the navigation route. The navigation instructions provide direction to navigation points along the navigation route. In one embodiment, primary navigation instructions are produced that include cardinal direction instructions when the telematics unit is within the global navigation zone. In an example and referring to FIG. 3, Cardinal direction instructions are utilized, such as, "proceed North on Division St." in an attempt to direct the telematics equipped mobile vehicle to turn from street 302 to street 301 and onto navigation route 320. In another example and referring to FIG. 4, secondary navigation instructions are produced that include plain language direction instructions when the telematics unit is within the local navigation zone, such as. In this example, the secondary navigation instructions include "turn Right onto Division St." in an attempt to direct telematics equipped mobile vehicle 430 to exit initial navigation point 405 and enter street 402 and hence onto navigation route 420. At step 580, the method is terminated.

In another embodiment, method 500 may further include steps to compensate for the mobile vehicle traveling in an undesirable direction. Such steps may include receiving a subsequent location signal defining an approximate subsequent geographic location of the telematics unit to the telematics unit, analyzing the location signal and the subsequent location signal to produce a direction of travel route, comparing the direction of travel route to the navigation route, determining if the direction of travel route is included within the navigation route, and producing corrective navigation instructions when the direction of travel route is not within the navigation route. In yet another embodiment, a further step includes producing a confirmation message when the direction of travel route is within the navigation route.

Figure 6:
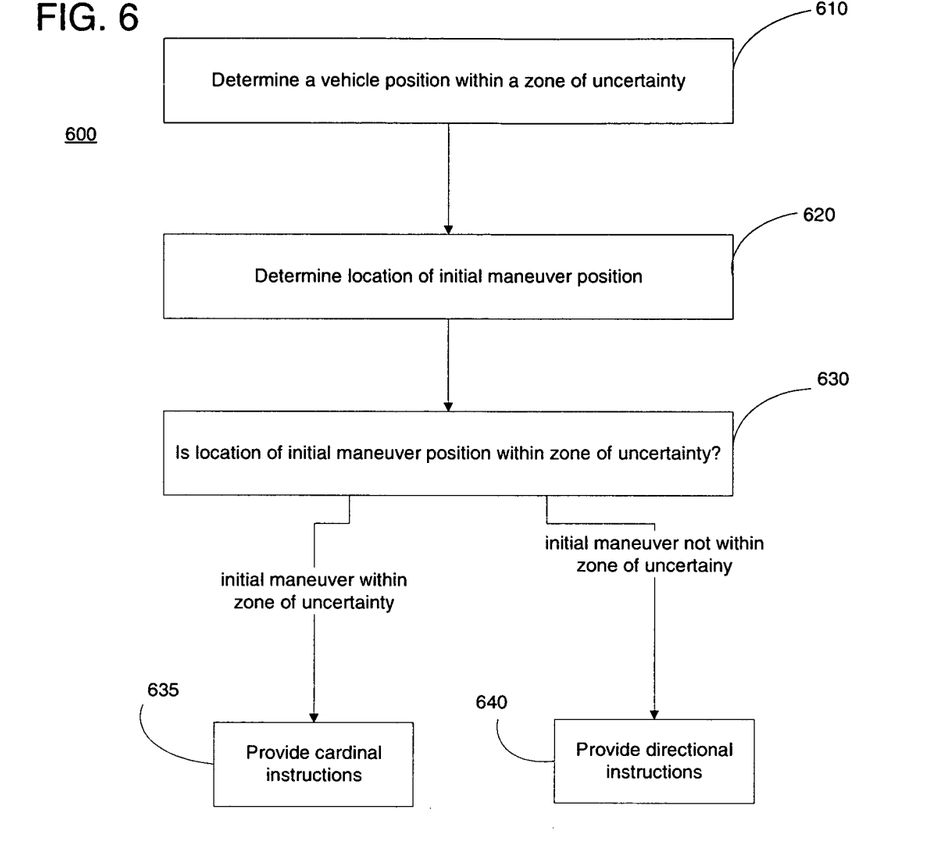
FIG. 6 illustrates another embodiment of a method for providing navigational instructions to a driver.

FIG. 6 illustrates another embodiment of a method 600 for providing navigational instructions to a driver. Method 600 begins by determining a vehicle position within a zone of uncertainty at step 610. The zone of uncertainty may be a region of GPS uncertainty, a region of GPS interference, an urban canyon, or other geographic location of unreliable GPS data. The provider of navigational instructions will know that a vehicle is located within the zone of uncertainty, but not the precise location of the vehicle, such that the vehicle seeking navigational assistance may be physically located anywhere within the zone of uncertainty.

The location of an initial maneuver position is determined at step 620. The initial maneuver position is a geographical location that is relevant to navigational instructions. For example, the initial maneuver position may be a waypoint or an intersection on a route being navigated. In another example, a navigational route requires a turn or a change in direction at the initial maneuver position. Those of ordinary skill in the art will readily recognize that the initial maneuver position may be a first, second, or nth position along a route without departing from the inventive principles herein.

The provider of navigational instructions determines, at step 630 if the initial maneuver position in within the zone of uncertainty. If the initial maneuver position is within the zone of uncertainty, a cardinal instruction is provided to the driver at step 635. Conversely, if the initial maneuver position is not within the zone of uncertainty, a directional instruction is provided the driver at step 640.

Method 600 may iterate repetitively until the driver arrives at the final destination on the route being navigated.

The above-described methods and implementation for operating a telematics enabled mobile vehicle communication system are example methods and implementations. These methods and implementations illustrate one possible approach for operating a telematics enabled mobile vehicle communication system. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of operating a telematics enabled mobile vehicle communication system, comprising:
   receiving a navigation request from a user interface at a telematics unit;
   receiving a location signal at the telematics unit, the location signal defining an approximate geographic location of the telematics unit;
   analyzing the navigation request and the location signal to produce a navigation route, the navigation route defined by a plurality of navigation points including an initial navigation point and one or more additional navigation points;
   producing a local navigation zone and a global navigation zone based on the analyzed location signal, each navigation zone defining a geographic area concentrically radiating from a known geographic location;
   determining which navigation zone the initial navigation point is within; and
   producing navigation instructions based on the determined navigation zone and the navigation route, wherein the navigation instructions provide direction to navigation points along the navigation route.

2. The method of claim 1, further comprising:
   providing the produced navigation instructions to a user interface.

3. The method of claim 1, further comprising:
   receiving a subsequent location signal at the telematics unit, the subsequent location signal defining, an approximate subsequent geographic location of the telematics unit;

analyzing the location signal and the subsequent location signal to produce a direction of travel route;

comparing the direction of travel route to the navigation route;

determining if the direction of travel route is included within the navigation route; and producing corrective navigation instructions when the direction of travel route is not within the navigation route.

4. The method of claim 3, further comprising:

producing a confirmation message when the direction of travel route is within the navigation route.

5. The method of claim 1, wherein the navigation instructions include cardinal direction instructions when the telematics unit is within the local navigation zone.

6. The method of claim 1, wherein the navigation instructions include plain language direction instructions when the telematics unit is within the global navigation zone.

7. The method of claim 1, wherein the local navigation zone is associated with the approximate geographic location of the telematics unit.

8. The method of claim 1, wherein the user interface is selected from the group consisting of an audio user interface, a text user interface, a video user interface, a combination video/text user interface, a combination audio/text user interface, voice user interface, a voice menu, a physical user interface, a button user interface, a liquid crystal display, and a text-to-speech interface.

9. A computer readable medium storing a computer program comprising:

computer readable code for providing a received navigation request from a user interface to a telematics unit;

computer readable code for providing a received location signal to the telematics unit, the location signal defining an approximate geographic location of the telematics unit;

computer readable code for analyzing the navigation request and the location signal to produce a navigation route, the navigation route defined by a plurality of navigation points including an initial navigation point and one or more additional navigation points;

computer readable code for producing a local navigation zone and a global navigation zone based on the analyzed location signal, each navigation zone defining a geographic area concentrically radiating from a known geographic location;

computer readable code for determining which navigation zone the initial navigation point is within; and computer readable code for producing navigation instructions based on the determined navigation zone and the navigation route, wherein the navigation instructions provide direction to navigation points along the navigation route.

10. The computer readable medium of claim 9, further comprising:

computer readable code for providing the produced navigation instructions to a user interface.

11. The computer readable medium of claim 9, further comprising:

computer readable code for providing a received subsequent location signal to a telematics unit, the subsequent location signal defining an approximate subsequent geographic location of the telematics unit;

computer readable code for analyzing the location signal and the subsequent location signal to produce a direction of travel route;

computer readable code for comparing the direction of travel route to the navigation route;

computer readable code for determining if the direction of travel route is included within the navigation route; and computer readable code for producing corrective navigation instructions when the direction of travel route is not within the navigation route.

12. The computer readable medium of claim 11, further comprising:

computer readable code for producing a confirmation message when the direction of travel route is within the navigation route.

13. The computer readable medium of claim 9, wherein the navigation instructions include cardinal direction instructions when the telematics unit is within the local navigation zone.

14. The computer readable medium of claim 9, wherein the navigation instructions include plain language direction instructions when the telematics unit is within the global navigation zone.

15. The computer readable medium of claim 9, wherein the local navigation zone is associated with the approximate geographic location of the telematics unit.

16. The computer readable medium of claim 9, wherein the user interface is selected from the group consisting of an audio user interface, a text user interface, a video user interface, a combination video/text user interface, a combination audio/text user interface, voice user interface, a voice menu, a physical user interface, a button user interface, a liquid crystal display, and a text-to-speech interface.

17. A telematics enabled mobile vehicle communication system, comprising:

means for receiving a navigation request from a user interface to a telematics unit;

means for receiving a location signal to the telematics unit, the location signal defining an approximate geographic location of the telematics unit;

means for analyzing the navigation request and the location signal to produce a navigation route, the navigation route defined by a plurality of navigation points including an initial navigation point and one or more additional navigation points;

means for producing a local navigation zone and a global navigation zone based on the analyzed location signal, each navigation zone defining a geographic area concentrically radiating from a known geographic location;

means for determining which navigation zone the initial navigation point is within; and means for producing navigation instructions based on the determined navigation zone and the navigation route, wherein the navigation instructions provide direction to navigation points along the navigation route.

* * * * *